United States Patent [19]

Warner et al.

[11] Patent Number: 5,319,662

[45] Date of Patent: Jun. 7, 1994

[54] LONGITUDINAL DISCHARGE LASER BAFFLES

[75] Inventors: Bruce E. Warner, Livermore; Earl R. Ault, Dublin, both of Calif.

[73] Assignee: The United States of America as represented by the United States Department of Energy, Washington, D.C.

[21] Appl. No.: 640,173

[22] Filed: Jun. 22, 1984

[51] Int. Cl.$^5$ ............................ H01S 3/02; H01S 3/223
[52] U.S. Cl. ........................................ 372/56; 372/33; 372/62; 359/345
[58] Field of Search .................. 372/33, 34, 56, 61, 372/62, 703; 350/276 SL, 442; 330/4.3

[56] References Cited

U.S. PATENT DOCUMENTS

| | | | |
|---|---|---|---|
| 2,670,656 | 3/1954 | Braymer | 350/276 SLA |
| 3,699,471 | 10/1972 | Mulready et al. | 350/276 SL |
| 3,934,211 | 1/1976 | Sucov et al. | 372/56 |
| 4,025,818 | 5/1977 | Giguere et al. | 330/4.3 |
| 4,106,856 | 8/1978 | Babish | 350/442 |
| 4,217,026 | 8/1980 | Radovich | 350/276 SL |
| 4,287,484 | 9/1981 | Wang et al. | 372/34 |

FOREIGN PATENT DOCUMENTS 0039082  3/1983  Japan ..................... 372/34

OTHER PUBLICATIONS

Leinert et al, "Stray Light Suppression . . . Experiments," Mar. 1974, pp. 556–564, Appl. Opt., vol. 13, No. 3.
Butler, "Efficient Baffles For Laser . . . Experiments", Oct. 15, 1982, pp. 3617–3618, Appt. Opt., vol. 21, No. 20.

Primary Examiner—Nelson Moskowitz
Attorney, Agent, or Firm—Miguel A. Valdes; Roger S. Gaither; William R. Moser

[57] ABSTRACT

The IR baffles placed between the window and the electrode of a longitudinal discharge laser improve laser performance by intercepting off-axis IR radiation from the laser and in doing so reduce window heating and subsequent optical distortion of the laser beam.

11 Claims, 1 Drawing Sheet

LONGITUDINAL DISCHARGE LASER BAFFLES

FIELD OF THE INVENTION

The United States Government has rights in this invention pursuant to Contract No. W-7405-ENG-48 between the United States Department of Energy ana the University of California for the operation of Lawrence Livermore National Laboratory.

CROSS-REFERENCE TO RELATED APPLICATION

Related patent application Ser. No. 640,174 is filed on the same day as the present patent application and is assigned to the same assignee.

BACKGROUND OF THE INVENTION

The present invention relates to improved heat flow control in longitudinal discharge lasers, and more particularly, it relates to improved infrared heat flow control in metal vapor lasers.

Longitudinal discharge lasers have a number of uses. Specifically for metal vapor lasers, applications are known in uranium isotope separation using copper vapor and in the medical field using gold vapor. Other metal vapor laser media include lead and barium. An example of the use of copper vapor lasers to pump dye lasers for uranium isotope separation is describes in UCRL-88040 on *Atomic Vapor Laser Isotope Separation* by James I. Davis. This paper describes work done as of the Fall of 1982 with individual copper vapor laser pumped dye laser oscillators run over 1,000 hours in accumulated time. This lifetime test not only illustrates that copper vapor lasers act usefully as dye laser pump sources, but also that copper vapor laser lifetime is an important issue for atomic vapor laser isotope separation. Since the copper vapor lasers had to be stopped several times to replenish the copper supply, the copper vapor laser design employed in the 1,000 hour life test differs from the design needed for an isotope separation plant.

In the past, infrared radiation from the walls of a longitudinal discharge laser was not well controlled as it propagated past the electrode toward the window. Not only could infrared (IR) radiation travel directly down the laser axis and hit the window, but also IR radiation could strike the walls of the tube surrounding the laser and reflect to subsequently hit the window. Two examples showing the unobstructed path for IR radiation between the electrode and the window are U.S. Pat. No. 3,654,567 (FIGS. 1 and 2) and U.S. Pat. No. 4,247,830 (FIG. 1). In each case IR radiation emerging from the central discharge region of the laser past the electrode is free to hit the window directly or after reflection.

IR radiation striking the windows of a longitudinal discharge laser causes problems if the windows are made of a material which significantly absorbs in the infrared. A typical window material is quartz, which is an IR radiation absorber. The IR radiation striking the windows is then absorbed in part by the windows. This absorption causes heating of the window. As window material gets hotter, its index of refraction changes. Also, there can be some warping of the window. The effect is a focusing of the laser beam as if the window had turned into a very long focal length lens. This focusing can reduce the laser power emerging from a train of laser amplifiers by up to one half. A choice of non-IR absorbing materials for windows leads to other problems, so a reduction in window heating effects in IR absorbing materials, such as quartz is desired.

SUMMARY OF THE INVENTION

It is an object of the invention to decrease the infrared (IR) radiation striking the windows after the IR radiation emerges past the electrode from the discharge region of a longitudinal discharge laser.

Another object is to increase the range of acceptable laser window materials.

A further object is to decrease the laser beam focusing effects due to window heating during the operation of a longitudinal discharge laser.

In brief, the invention relates to IR baffles placed between the window and the electrode on the end of a longitudinal discharge laser and includes placing a plurality of IR blocking baffles between the window and the electrode so as to block IR radiation propagating off the laser beam axis but not block the laser beam itself.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawing, which is incorporated and forms a part of the specification, illustrates an embodiment of the invention and, together with the description, serves to explain the principles of the invention.

DETAILED DESCRIPTION OF THE INVENTION

Figure 1:
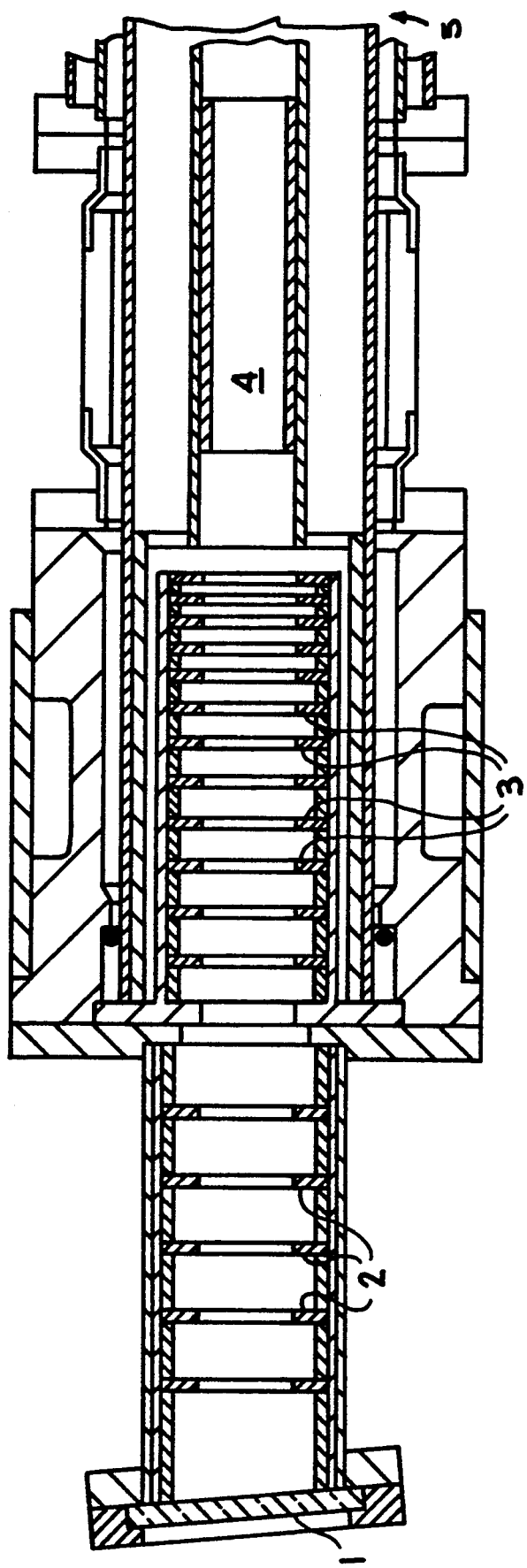
FIG. 1 is a perspective view with a cut-away showing the interior of a metal vapor laser end.

Reference will now be made in detail to a preferred embodiment of the invention, an example of which is illustrated in the accompanying drawing. While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Referring now to FIG. 1, there is shown the end of a metal vapor laser. The end of the laser comprises a window 1, IR baffles 2, electrode 3, and wick 4. Past the wick 4 is the laser gain region 5 which extends to the wick on the other end of the laser. The ends of the metal vapor laser are typically the same design. While the dimensions of components readily scale, the specific embodiment shown is for a copper vapor laser producing a 4 cm diameter laser beam. From window 1 to electrode 3 is 20.3 cm. The electrode 3 is 7.6 cm long. The space between the electrode 3 and the wick 4 is 5.1 cm. The wick 4 is 15.2 cm long, and the distance between the wicks which comprises the laser gain region 5 is 86.4 cm. The window 1 is of a material transmitting at the wavelength of the laser beam; here the material is quartz. Although a conductor can serve to block IR radiation, near a region of intense electrical discharge, the IR baffles are made typically of a non-conducting material such as quartz, pyrex or ceramic. The choice here is quartz. The IR baffles must block IR transmission and in a significant degree absorb the infrared radiation which emerges from the electrode, wick and laser gain region. The IR baffles have an interior diameter of 4.5 cm and an outer diameter of 6.5 cm yielding a ring of one centimeter in radial thickness. The cylindrical height of the ring is 0.1 cm. These rings are spaced apart along the laser axis at 1 cm intervals.

As shown in FIG. 1, the electrode 3 is of a new compound design. Each electrode element making up the electrode surface in the compound electrode is a ring of interior diameter 4.45 cm, outer diameter 5.71 cm and cylindrical height 0.05 cm. These electrode elements should be chosen from a material that does not poison the wick, or at least does so slowly, since electrode material is sputtered onto the wick during operation. The electrode material chosen here is tungsten. Spacer rings of copper maintain the distance between electrode elements. Since copper is in the environment already as the lasing medium, it is not a wick poison. The spacer ring interior diameter is 5.38 cm and the spacer ring outer diameter is 5.71 cm. The cylindrical height is 0.3 cm for the short spacer rings and 0.6 cm for the long spacer rings. The compound design electrode is held together by a conducting cylinder capped on each end to retain the electrode elements and spacer rings.

In operation the above-identified copper vapor laser produces a pulsed laser beam at 5 kHz. The laser current pulse width is 300 nsec with a 1,000 ampere peak current. The partial pressure of copper in the copper gain region 5 is approximately 0.1 Torr while the neon buffer gas partial pressure may be run anywhere in the range 20-50 Torr. The spaces between the interior most of the electrode elements form sites for hollow cathode discharge to take place in a stable manner. As electrode material is lost through sputtering in the first few electrode elements, the hollow cathode discharge can simply retreat to the next inter-electrode element spaces and thus continue stable laser operation for a prolonged period of time.

The operation of the present invention provides improved control of the heat flow from between the electrodes outward towards the windows of the lasers. Without the IR baffles 2 of the present invention, IR radiation can propagate down the laser toward the windows in a sufficiently off-axis manner to reflect off the laser walls one or more times. The spacing of the IR baffles is chosen so that an IR ray that just clears the next interior-most IR baffle and reflects from the laser wall will strike the next exterior-most baffle. The IR may be partially reflected back toward the electrode and be partially absorbed. Since the IR baffles take no part in the discharge, they need not be made of a conductor. The IR baffle material such as quartz does need to absorb in the IR. The IR baffles prevent much IR radiation from striking the window. An IR heated window changes in index of refraction and slightly in shape to effectively form a long focal length lens. Such a focusing effect can cut the power emerging out of a laser chain by up to half. Therefore, the present invention makes discharge laser operation more reliable since window heating is greatly decreased.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. Infrared baffles for longitudinal discharge lasers, comprising:
   a longitudinal discharge laser having a discharge region located on an axis, at each end of the discharge region there being located outward serially an electrode and then a window along and on the axis; and
   a plurality of baffles spaced apart along and on the axis between the window and the electrode of one end of the longitudinal discharge laser, the baffling being chosen from materials which do not transmit infrared radiation and spacing of the baffles being chosen so that an IR ray that just clears a next interior-most baffle and reflects from a laser wall will strike a next exterior-most baffle.

2. Infrared baffles for longitudinal discharge lasers as in claim 1, wherein the longitudinal discharge laser is a metal vapor laser.

3. Infrared baffles for longitudinal discharge lasers as in claim 2, wherein a lasing medium is chosen from the group consisting of copper, gold, barium and lead.

4. Infrared baffles for longitudinal discharge lasers as in claim 3, wherein the lasing medium is copper.

5. Infrared baffles for longitudinal discharge lasers as in claim 1, wherein the infrared baffles are made from a non-conducting material.

6. Infrared baffles for longitudinal discharge lasers as in claim 5, wherein the non-conducting material is quartz.

7. Infrared baffles for longitudinal discharge lasers as in claim 5, wherein the non-conducting material is pyrex.

8. Infrared baffles for longitudinal discharge lasers as in claim 5, wherein the non-conducting material is a ceramic.

9. Infrared baffler for longitudinal discharge lasers as in claim 1, wherein the infrared baffles are annular in shape.

10. A method for improving the efficiency of longitudinal discharge lasers, the method comprising:
   providing a longitudinal discharge laser having a discharge region located on an axis, at each end of the discharge region there being located outward serially an electrode and then a window along and on the axis;
   providing a plurality of baffles spaced apart along and on the axis between the window and the electrode of at least one end of the longitudinal discharge laser; and
   blocking further passage of infrared radiation which has been propagating from the discharge region toward a window, the blocking only taking place outward from a predetermined distance from the axis through spacing of the baffles being chosen so that an IR ray that just clears a next interior-most baffle and reflects from a laser wall will strike a next exterior-most baffle.

11. Infrared baffles for discharge lasers, comprising:
 a discharge laser having a discharge region located on an axis, at each end of the discharge region there being located a window on the axis; and
 a plurality of baffles spaced apart along and on the axis between the window and the discharge region of one end of the discharge laser, the baffling being chosen from materials which do not transmit infrared radiation and spacing of the baffles being chosen so that an IR ray that just clears a next interior-most baffle and reflects from a laser wall will strike a next exterior-most baffle.

* * * * *